United States Patent [19]

Dussan V. et al.

[11] Patent Number: 5,661,237
[45] Date of Patent: Aug. 26, 1997

[54] METHOD AND APPARATUS FOR LOCALLY MEASURING FLOW PARAMETERS OF A MULTIPHASE FLUID

[75] Inventors: Elizabeth B. Dussan V., Ridgefield, Conn.; François Hecquet, Montgeron, France; Fadhel Rezgui, Sceaux, France; Eric Veignat, Montrouge, France

[73] Assignee: Schlumberger Technology Corporation, Ridgefield, Conn.

[21] Appl. No.: 473,636

[22] Filed: Jun. 7, 1995

[30] Foreign Application Priority Data

Mar. 23, 1995 [FR] France ................................. 95 03436

[51] Int. Cl.⁶ ................................................. E21B 47/10
[52] U.S. Cl. .................. 73/152.18; 73/61.44; 73/152.42; 324/324
[58] Field of Search ............................. 73/61.44, 152.06, 73/152.08, 152.18, 152.42; 324/324; 374/324

[56] References Cited

U.S. PATENT DOCUMENTS

| | | | |
|---|---|---|---|
| 2,415,636 | 2/1947 | Johnson | 324/324 |
| 3,518,530 | 6/1970 | Wilson | 324/324 |
| 3,792,347 | 2/1974 | Hawley | 324/30 R |
| 4,282,481 | 8/1981 | Dunn | 324/446 |
| 4,441,362 | 4/1984 | Carlson | 73/155 |
| 4,974,446 | 12/1990 | Vigneaux | 73/861.04 |
| 4,975,645 | 12/1990 | Lucas | 324/324 |
| 4,980,642 | 12/1990 | Rodney | 324/325 |

FOREIGN PATENT DOCUMENTS

| | | | |
|---|---|---|---|
| 1467151 | 12/1966 | France . | |
| 2 637 089 | 11/1990 | France . | |
| 2 645 901 | 7/1991 | France . | |
| 2 675 202 | 10/1992 | France . | |
| 25 58 588 | 7/1977 | Germany . | |
| 2558588-A | 7/1977 | Germany | G01N 27/22 |

Primary Examiner—Michael Brock
Assistant Examiner—Jay L. Politzer
Attorney, Agent, or Firm—Martin D. Hyden; Keith G. W. Smith

[57] ABSTRACT

A method for producing, in a hydrocarbon well, a signal indicative of a local flow parameter of a multiphase fluid, includes the steps of placing at least one local sensor in the fluid and producing a signal whose level is characteristic of the phase in which the sensor is immersed, the signal being generated at a spike whose radius of curvature is less than 100 microns. The method is applicable to determining hold-ups of different phases of the fluid.

33 Claims, 7 Drawing Sheets

FIG_1

FIG_2

FIG_3

FIG_4

FIG_7

METHOD AND APPARATUS FOR LOCALLY MEASURING FLOW PARAMETERS OF A MULTIPHASE FLUID

FIELD OF THE INVENTION

The invention relates to studying the flow parameters of a multiphase fluid, in particular a fluid produced in a hydrocarbon well. More particularly, the invention relates to a method and to apparatus for measuring the static proportion or "hold-up" associated with each phase in a hydrocarbon well.

BACKGROUND OF THE INVENTION

Static proportion or "hold-up" is defined as being the volume occupied by one particular phase in a given volume of the well as defined between two right sections.

Fluids coming from a hydrocarbon well are usually multiphase fluids, comprising mixtures of brine and oil, where the term "oil" is applied herein to all hydrocarbons, in particular of the petroleum type. Typically, water forms a continuous phase while oil is dispersed in the form of bubbles or droplets, with the number and size thereof increasing with increasing oil hold-up, which bubbles or droplets may possibly coalesce; at present, the worldwide average for production from a well is about 15% oil to 85% water. If the oil content is high, then the system is inverted and it is oil that constitutes the continuous phase.

Analysis of the production from a well, e.g. to determine the hydrocarbon flow rate profile as a function of depth, relies in particular on knowledge of the respective proportions of the various phases present. A more particular aspect of such analysis is localizing so-called "productive" zones that contain, at least some hydrocarbons, and zones that are completely unproductive, that contain water only, and which it may be appropriate to isolate in order to limit inflow of water. Particularly for a well providing marginal production, it is desirable for such localization to be highly accurate. Furthermore, inflows of oil and of water must be capable of being quantified in reliable manner, even if the oil content is very low, e.g. less than 5%.

To determine the proportions of water and of oil, it is known, e.g. from French patent 1 467 151, to use a gradiomanometer, a device which measures pressure gradient over a given height, which gradient may be considered as being a function solely of the difference in level between the two measurement points and of the apparent density of the fluid. Given the respective densities of the various phases, it is then possible to calculate the various proportions thereof.

By definition, that type of measurement assumes that the density of the aqueous phase is known accurately. Thus, to measure an oil content of 5%, the acceptable error on the value estimated for the density of the aqueous phase must be less than 0.01 grams per cubic centimeter (g/cc). Unfortunately, the salinity of the waters encountered varies over a very wide range. Although it is indeed possible to perform a calibration measurement by placing the gradiomanometer in a zone where the oil content is nil, e.g. at the bottom of the well, that nevertheless assumes that the calibration water is the same as the water that flows into the well, and that is not always true given the various kinds of "pollution" that can stem from stagnant drilling muds or from inflows of water having different degrees of salinity. For want of good calibration, oil inflows are not located with the desired accuracy.

Further, it is known that measurements by a gradiomanometer are affected whenever production flow rates are very high (friction effects) or whenever flows are not steady (constrictions). Finally, given the principle on which it operates, it is clear that a gradiomanometer is not suitable for performing measurements in wells that are highly deviated or horizontal.

Determining hold-up can also be performed by sampling, e.g. by measuring the variation in the capacitance of a capacitor placed in the flow or by irradiation using photons. However that suffers from the same drawback as a gradiomanometer: the values for water and for oil must be known accurately.

Another approach consists in taking measurements by means of local sensors that produce signals having different levels depending on which phase is in contact with the sensor. U.S. Pat. No. 3 792 347 (Hawley) thus proposes an electrical type measurement by measuring resistivity. Proposals have also been made to perform optimal type measurement by refracting a light ray at the end of an optical fiber or radiofrequency type measurement by measuring dielectric constant (German patent application 2 558 588, French patent applications 2 637 089, 2 645 901, or 2 675 202).

The term "local" is validly applied to a measurement only if the zone of fluid being analyzed at a given instant by a local sensor is small relative to the objects being measured, in this case bubbles dispersed in the continuous phase. In addition, the response of the sensor in a given phase must be stable, and ideally independent of parameters such as chemical composition of the measured phase (e.g. salt content), temperature of the fluid, flow rate of the fluid, etc., for example. This implies, in particular, considerable contrast between the resulting signals. In addition, the disturbance made to the flow by the presence of the sensor must be as small as possible.

If such ideal conditions are in fact achieved, then the hold-up value of a given phase in the stream of fluid passing the probe is quite simply equal to the ratio between the sum of the time periods during which said phase has been detected by the probe divided by the total duration of the measurement.

Although highly attractive in theory, that approach nevertheless suffers from a major difficulty, namely that of performing a measurement by contact while not disturbing the fluid flow. To operate properly, the probe must penetrate into a bubble of oil without deflecting it or deforming it, and in addition the "active" portion of the probe must retain no trace of the bubble of oil once it has moved on downstream from the probe.

In fact, experiments performed using probes known in the art have turned out to be unsatisfactory, in particular because of the poor reliability of the probes and also because of insufficient accuracy, generally with oil contents being overestimated. Far from satisfying the theoretically expected binary characteristics, the signals present major defects, e.g. such as relatively long water/oil transition zones, a decrease over time in the level that corresponds to water, and fluctuations in the levels that correspond both to water and to oil.

SUMMARY OF THE INVENTION

On analyzing the reasons why the signals are unsatisfactory, the inventors of the present invention have established a correlation with a phenomenon whereby the probes are fouled or dirtied by crude oil.

An extreme case is that where the sensor becomes covered in a hydrocarbon film that isolates it completely from the surrounding fluid: under such circumstances, it is clear that the probe becomes completely blind. This phenomenon which is clearly difficult to avoid when the crude oil is very viscous, but can be detected, and it does not explain why measurements are inaccurate.

The inventors of the present invention have shown that probes known in the art, when placed in an oil well, become covered in a film of oil whose thickness depends on a whole series of factors, in particular such as the speed of bubbles going past the probe, their frequency, the speed of the aqueous phase, and indeed the wetting properties of the probe. Depending on the thickness of the film, signals are observed to drift to a greater or lesser extent, which may be so great as to give rise to total absence of any signals.

Faced with the multiplicity of such factors, and the fact that they are closely tied to the magnitudes which it is desired to measure, it has been very difficult to take account of the film of oil in interpreting results. Thus, a primary object of the inventors of the present invention has been to provide a local measurement probe that is more reliable, that is considerably less sensitive to phenomena of dirtying by crude oil, and that is also capable of accurately detecting the levels at which oil and water inflows are located.

According to an aspect, the method thus provides a method of determining, in a hydrocarbon well, at least one local flow parameter of a multiphase fluid, the method comprising the steps of placing in the fluid at least one local sensor and producing a signal whose level is characteristic of the phase in which said sensor is immersed, said signal being generated at a pointed tip, or "spike", whose radius of curvature is less than 100 microns. Said radius of curvature is advantageously less than 50 microns, and is preferably close to 10 microns.

BRIEF DESCRIPTION OF THE DRAWINGS

Further advantageous characteristics and details of the invention appear from the following description given with reference to the accompanying figures, in which.

DETAILED DESCRIPTION OF THE INVENTION

It should be observed that all portions of the probe that are to be immersed in the measured phase must be pointed in shape. If the probe is of the transmitter/receiver type, both of its elements must be immersed simultaneously in the same bubble during measurement, and according to the invention it includes two adjacent spikes that are spaced apart by a distance that is small relative to the objects being measured.

It is indeed known for such probes to be "pointed" in shape, with the major preoccupation being that of preventing bubbles being deflected from their path by "bouncing" off a probe instead of being penetrated by the probe as is required for measurement purposes. Thus, probes known in the art are relatively free, with sensors having a diameter that lies, for example, in the range of about 1 millimeter, which value can indeed be considered as being small compared with the assumed radius of bubbles in the dispersed phase, which is estimated as being close to 5 to 6 millimeters.

Nevertheless, that has not brought out the need for measurement to be performed on a spike. However, it has been observed that whatever the fineness of the sensor, if the measurement is performed on a zone that is substantially plane, for example such as the end of an optical probe or a coaxial cable, then there is no way of avoiding the formation of a film of oil, entraining the drawbacks mentioned above. A probe having a local sensor whose diameter does not exceed 100 microns but whose end section is nevertheless straight, has thus been found to be quite unsatisfactory. In contrast, probes having local sensors that are highly pointed remain remarkably clean and provide signals whose levels do not vary over time, and are easily interpreted, even when the fluid has a high content of hydrocarbons.

This remarkable result is associated firstly with the fact that in the presence of brine, the smallest contact angle measured in oil is greater than zero: in other words, oil is not tangent to the solid surface but comes to form drops such that the brine can displace the oil, and secondly, in application of the Laplace-Young equation, a reduction in the radius of curvature of the metal surface in contact with the drop of oil is accompanied by a very large increase in the pressure exerted by the oil/water interface. Thus, if the measurement is performed on a plane surface, the pressure exerted by the water is zero; whereas the sharper the spike, the greater the efficiency of water at expelling drops of off.

In addition, the film of oil or water surrounding the sensor (depending on the phase that is present at a given instant) thins quicker with smaller radius of curvature of the electrode. Very pointed local sensors thus contribute to obtaining transitions that are very short between two phases, which factor improves measurement accuracy.

Independently of being pointed, the sensor is advantageously small relative to the size of the objects measured. In general, its dimensions are thus of millimeter order or smaller, both in thickness (diameter at the base of the spike) and in length of the spike.

In designing the tool of the invention, relatively robust construction should be provided, well adapted to conditions in an oil well, and in particular account should be taken of the downhole pressure and temperature conditions, and the tool should withstand abrasion, e.g. due to sand entrained by the fluid. In addition, it is desirable that measurement should require neither calibration nor prior knowledge of the phases present.

The signal generated at the pointed tip of the sensor is preferably responsive to the specific impedance of the fluid in which the sensor is immersed. In accordance with the invention, the magnitude detected is preferably resistivity of the phase surrounding the local probe. Since the ratio between the resistivity of oil and that of salt water is of the order of $10^9$, the contrast between the signals for the two phases is very large, and in particular much greater than any variations in level within each of the phases, e.g. due to differences in salinity. Further, when the continuous phase is constituted by brine, as is usually the case, the probe is immersed in an electrically conductive medium and there is no need for a return electrode in the immediate vicinity of the measurement electrodes, assuming that the water is used as electrical ground. As a result the resolution of the probe is improved since it is easy to detect bubbles even of very small diameter.

For fluids in which the continuous phase is oil, there is provided a pair of electrodes spaced apart by a distance which is smaller than the size of the smallest bubbles to be detected, and in practice not more than 1 mm apart, given that the diameter of the smallest bubbles is generally estimated at being close to 2 mm.

In a preferred variant of the invention, alternating current is used, in particular in the range 1 kHz to 1 MHz. Such frequencies avoid effects associated with polarization phenomena and electrochemical reactions in the vicinity of the probe. In practice, a frequency lying in the range 100 kHz to 300 kHz has been adopted.

Essentially to ensure a good signal/noise ratio, it is desirable to avoid using low voltages, e.g. less than 1 volt. On the other hand, voltages should not be too large, both for safety and power consumption reasons. Corrosion problems may also appear with very high voltages. As an indication, voltages lying in the range 2 V to 20 V are well adapted to this type of measurement. It should be observed that such levels are entirely compatible with a battery power supply, which constitutes an important advantage for this type of tool.

The probes preferably extend at 180° to the flow, in other words the spikes should point towards the bottom of the well, extending parallel to the axis of the well, with an offset of about 20° about said preferred position not giving rise to significant differences. This makes it possible to minimize fouling of the parts surrounding the electrodes. In general, cable speed should be greater than or equal to bubble speed, where speeds are measured positively in the upward direction. In addition, the accuracy of measurement is considerably increased if measurement is performed while the tool is moving against the flow, i.e. while the tool is being lowered. Very good results have been obtained at speeds of about 10 feet per minute (3.048 meters per minute), for example, even though measurement accuracy is still highly satisfactory for speeds that are more than ten times greater.

The number of local sensors is typically of the order of four or six, and they are uniformly spaced apart angularly. In this way, it is possible to detect non-uniform flows, in particular stratification of various phases, as commonly occurs in wells that are highly deviated.

In a first embodiment of the invention, the measurement tool is thus mainly constituted by an elongate cylindrical body suitable for being moved inside the casing of the well while suspended at the end of a cable. Radially extending arms are actuated by a motor between a first position where the arms are folded along the cylindrical body and at least one deployed position. The end of an arm constitutes or carries an electrode. The tool is preferably provided with a centralizer, e.g. of conventional type.

In a particularly preferred variant of the invention, the arms include electrode carriers provided with retractable sockets such that firstly installing and replacing electrodes is facilitated, and secondly the pointed ends of the electrodes are protected when not performing measurement operations.

Advantageously, the arms may be constituted by the arms of the centralizer. In this way, the same motor suffices both to deploy the centralizer and to deploy the probes. The electrode carriers are advantageously disposed on that portion of the centralizer which is closest to the walls of the well or the casing so as to perform measurements in the immediate proximity of the wall, which is of particular use with deviated wells.

Given the very corrosive nature of the medium, the electrodes are preferably made of a non-oxidizable material, in particular stainless steel, molybdenum, tungsten, platinum, gold, etc., but less noble materials such as copper for example may also be used providing they are given protective treatment, e.g. gold plating.

The detector associated with the probe for the purpose of converting probe impedance into a voltage signal is preferably selected so that the signal is at a maximum for probe impedances that are less than or equal to the probe impedance of measured in the conductive zone of the sensor, such that the maximum signal from the detector is indeed obtained when the sensor is immersed in the electrically conductive aqueous phase. As a corollary, it is generally preferred to use sensors made of a material whose contact impedance is small, in particular less than 0.5 $\Omega/cm2$, and more preferably still less than 0.05 $\Omega/cm2$. Low contact impedance serves to make the aqueous phase signal more constant regardless of variations in salt concentration and in temperature, and contributes to obtaining a shorter transition between signals representative of different phases.

It can be shown that the contact impedance of an electrode is a function, in particular, of the specific contact impedance of the material constituting the measurement zone of the sensor and the reciprocal of the area of said measurement zone. To minimize contact impedance, it is therefore advisable to use materials having low specific contact impedance, such as gold, tungsten, or molybdenum, and to choose a shape that tends to maximize the area of the conductive zone of the sensor. To this end, sensors having a relatively large base are preferred. It should be emphasized at this point that the term "large base" is used herein to designate sensors which, at the base of the electrically conductive zone, have a diameter of 500 microns, for example, which sensors are to be preferred over finer sensors, e.g. having a diameter of about 200 microns. It is clear that sensors of the invention must in any case be very fine. Good results have been obtained with sensors having a terminal impedance of less than 1,500 ohms, and preferably of less than 1,000 ohms.

The non-electrically conductive portion of the probe is preferably made of a material which is easily wetted by a film of oil. Plastics type materials, and in particular epoxy resin, are preferred over glass or ceramics type materials. On the same lines, insulating surfaces presenting a certain amount of roughness are preferred.

Figure 1:
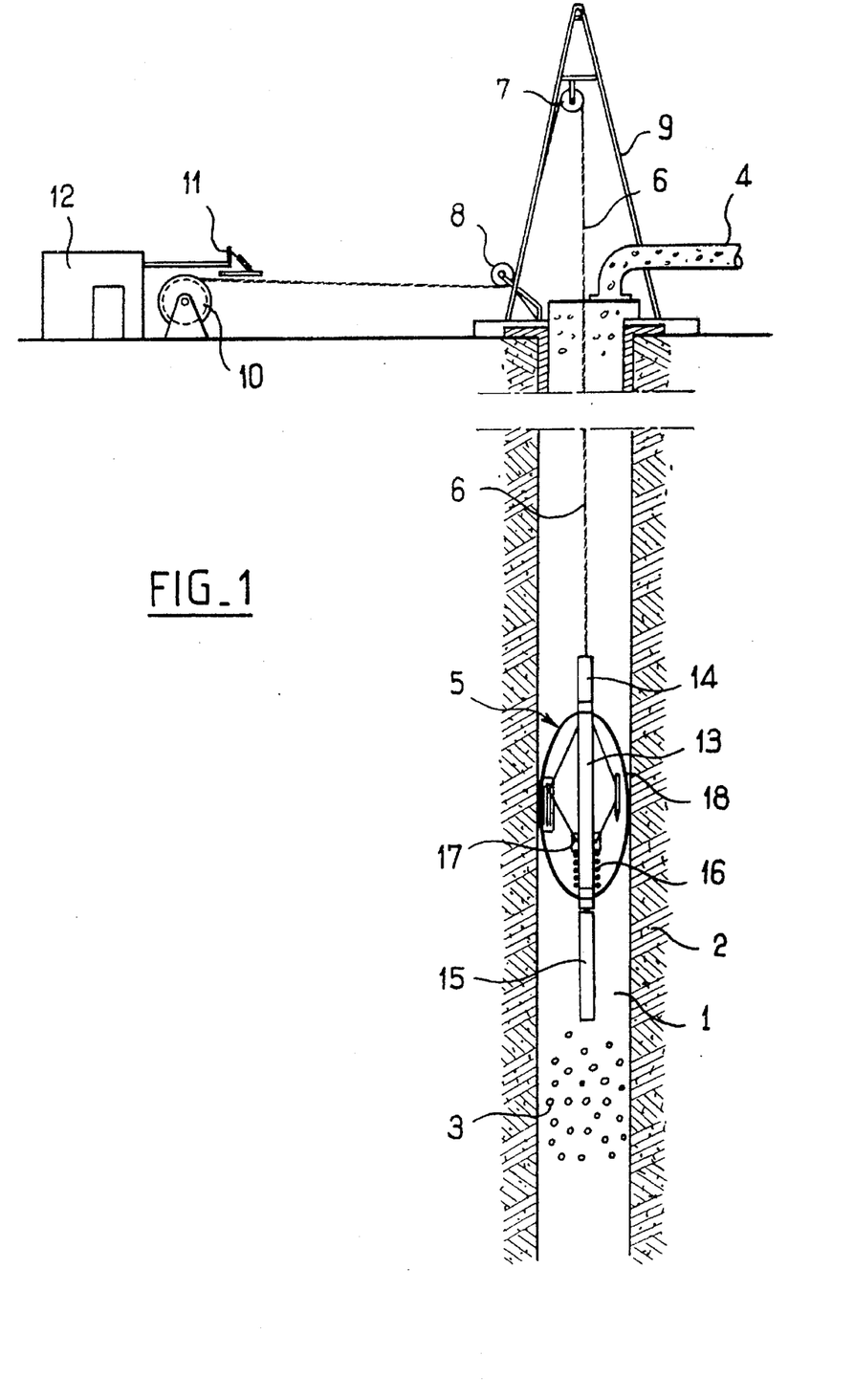
FIG. 1 is a diagram showing a tool of the invention in an oil well.

FIG. 1 is a diagram of a well 1 in production passing through geological formations 2 and conveying a flow of a multiphase fluid comprising a mixture of water and oil in an emulsion in the form of drops 3 in the continuous phase which is aqueous. The fluid reaching the surface is removed by a duct 4.

The tool 5 of the invention is suspended at the end of a cable 6 passing over sheaves 7, 8 mounted on a superstructure 9 and is wound on a winch 10. A conventional detector member 11 is associated with the winch 10 and detects marks, e.g. of magnetic type, disposed at regular intervals on the cable 6, thus enabling the depth of the tool 5 to be determined. Data acquisition means are located in a surface unit 12.

The tool 5 is essentially constituted by a tubular body 13, an electronics top section 14, and a motorization bottom section 15 which, via a spring 16, controls deployment of the arms 17 of a centralizer 18 of conventional type. The electronics section 14 includes the detector which is associated with the local sensors and which has the function of converting probe impedance into a voltage signal.

Figure 2:
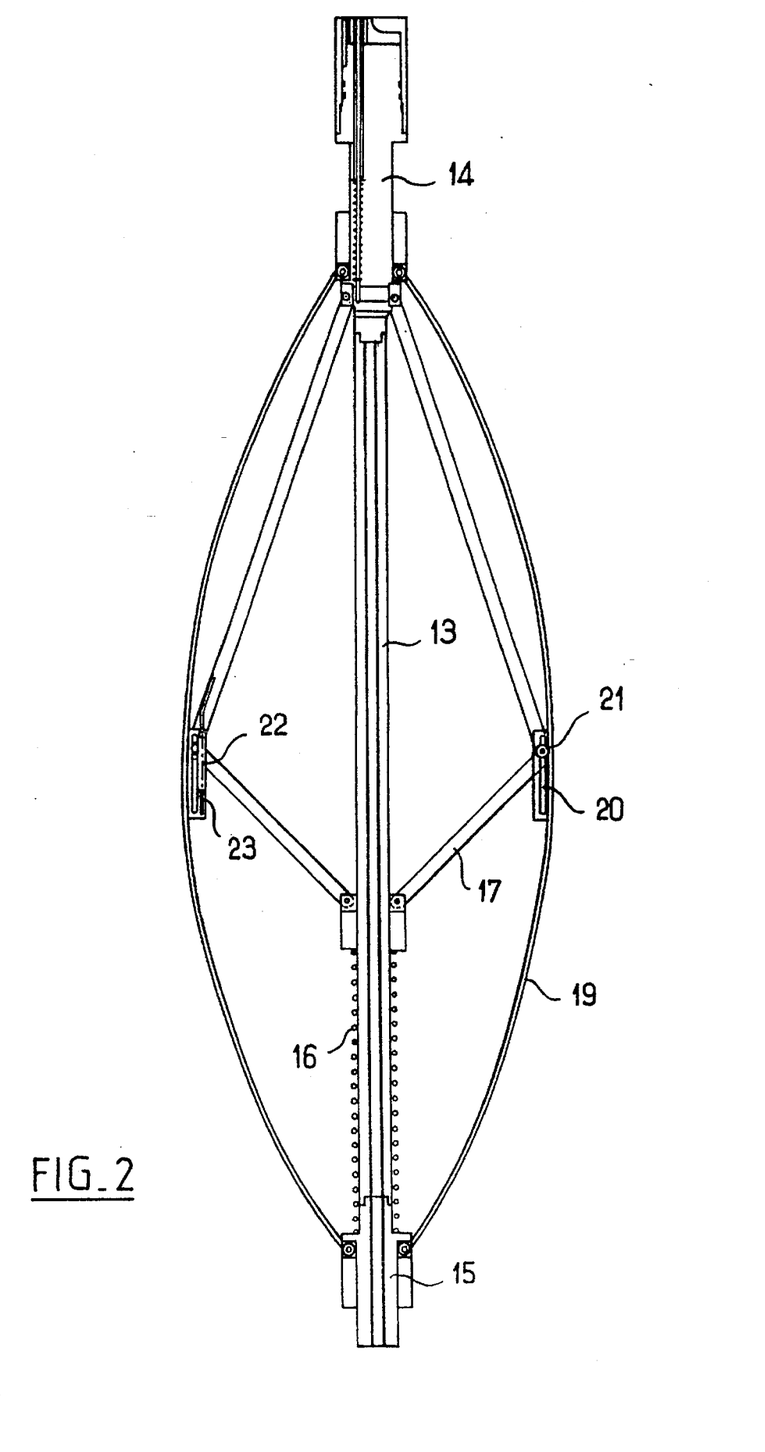
FIG. 2 is a more detailed diagram of the tool shown in FIG. 1.

As can be seen more particularly in FIG. 2, the centralizer 18 is constituted by flexible blades 19 on which slideways 20 are fixed in which there slide pivots 21 on which the opening arms 17 are hinged. Electrode carriers (not shown in this figure) are mounted on the slideways and carry the sensors which are constituted in this case by electrodes 22 having their pointed tips or spikes 23 pointing towards the bottom of the well. The electrical conductors advantageously pass along or in a housing provided for this purpose in each of the arms 17. In FIG. 2, only one electrode is shown for reasons of clarity, but it will be understood that tools preferably have a plurality of electrodes disposed in symmetrical manner.

With such a disposition, the electrodes extend parallel to the axis of the borehole, and they are disposed close to the wall of the borehole or the cylindrical casing lining the borehole, while nevertheless being far enough away therefrom to avoid being responsive to edge effects.

Naturally the disposition shown is given purely by way of illustration and the invention is not limited to this particular embodiment.

The electrodes comprise a main portion of electrically insulating material and a substantially conical conductive spike having a cone angle that is preferably less than 90° and more preferably about 45°, the tip being rounded, but with a small radius of curvature in accordance with the invention. The conical shape may be replaced by an equivalent shape, e.g. a chamfer (a wedge-shaped spike), ensuring that the angle between faces is less than 90°, and is preferably about 45°. The diameter of the electrodes must be of the same order of magnitude as the bubbles; good results have been obtained with electrodes having a diameter of less than 1 ram, e.g. close to 600 microns.

It is very important to ensure that the electrically conductive spike is "pointed". As mentioned above, the radius of curvature of the spike is preferably less than 50 microns and more preferably is about 10 microns. In addition, spikes that are too elongate are not preferred since a film of oil forms at some distance from the tip, such that the effective size of the sensor is reduced, giving rise to a risk of fluctuations in the level representing water, since the position of the film of oil is not constant. It is also important for the insulating portion of an electrode to be continuous with the electrically conductive portion, so as to avoid any sudden enlargement of the electrode with a discontinuity that would enhance oil accumulation thereat.

Figure 3:
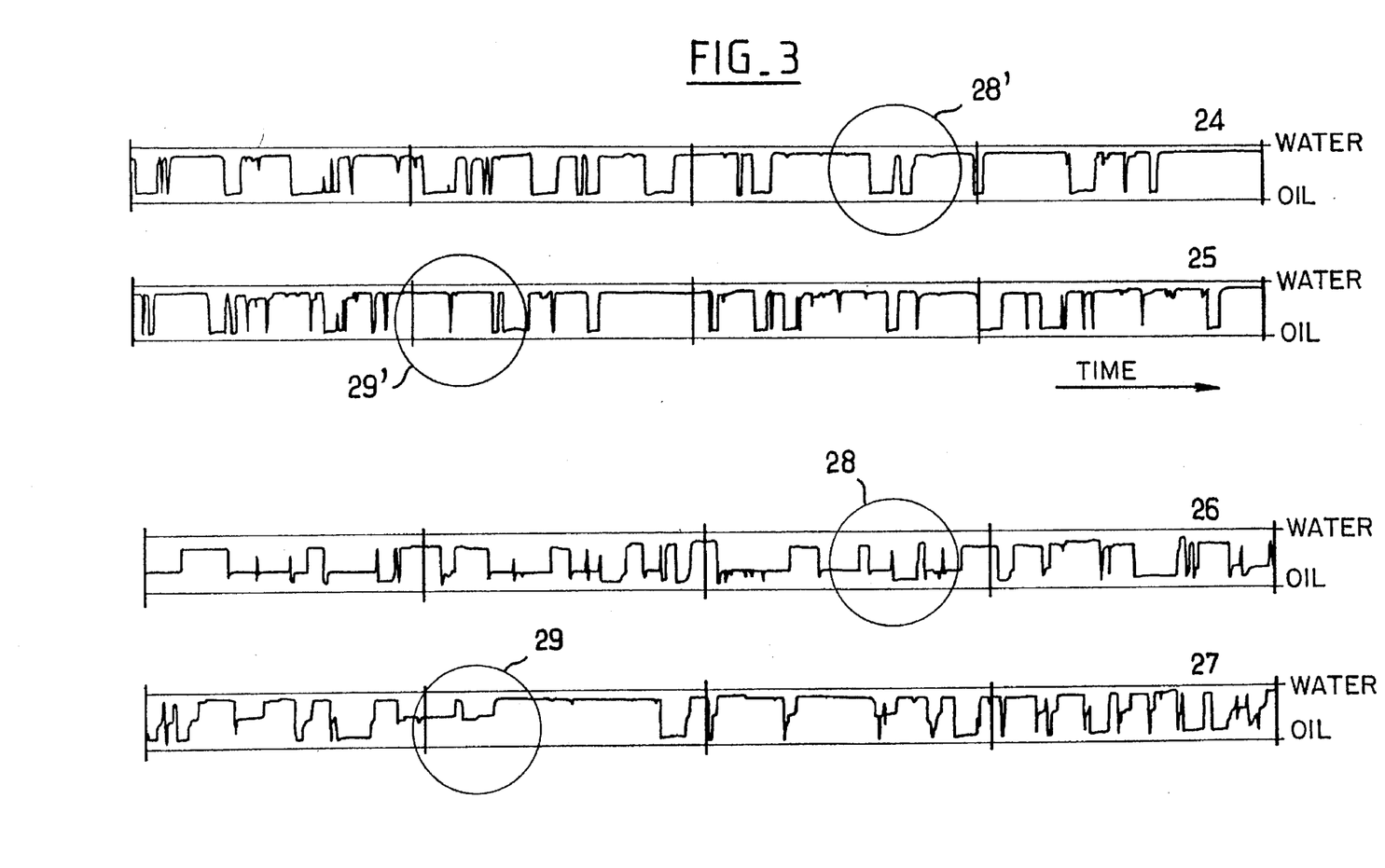
FIG. 3 shows recordings illustrating the importance of the "pointed" nature of the measurement electrodes and the binary structure of the resulting signals.

The importance of this consideration will be better understood in the light of FIG. 3 which reproduces recordings (called "logs" in the art) obtained in a production well using a tool of the invention having intact probes (recordings 24 and 25 performed at different depths) and damaged probes (recordings 26 and 27 corresponding respectively to recordings 24 and 25). For these recordings, and for all of those given herein by way of example, the voltage used was 15 volts and the frequency was 200 kHz.

With an intact spike, the low level (corresponding to a total absence of conduction, indicating the presence of a bubble of oil) and the high level (conductive water phase) are both remarkably constant. In addition, transitions are practically instantaneous. Measurement is therefore of the binary type: 0 for oil; 1 for water. The recording 25 obtained at another depth is very similar, showing that there is no drift in the high and low levels.

For the next two recordings 26 and 27, the spikes of the electrodes were slightly jagged: the conductive spike having a height of 200 microns included a defect whose largest dimensions did not exceed 20 microns to 30 microns. In spite of the very small size of said defect, it can be seen that it was sufficient to spread out transition time and above all that the resulting signal could no longer be considered as binary because of fluctuation in the levels, as can be seen in particular in circles zones 28 and 29 (in zone 28, in spite of appearances, what is happening is fluctuations in the level for water since oil can under no circumstances conduct electricity). A comparison with zones 28' and 29' that correspond to the same measurement depths but using spikes in good condition is most revealing: clearly the damaged spikes greatly overestimate the oil content, since oil remains "jammed" in the jagged portion for some length of time that can vary randomly. The signal is not zero since the captured droplet is not big enough to cover all of the conductive portion of the electrode.

Figure 4:
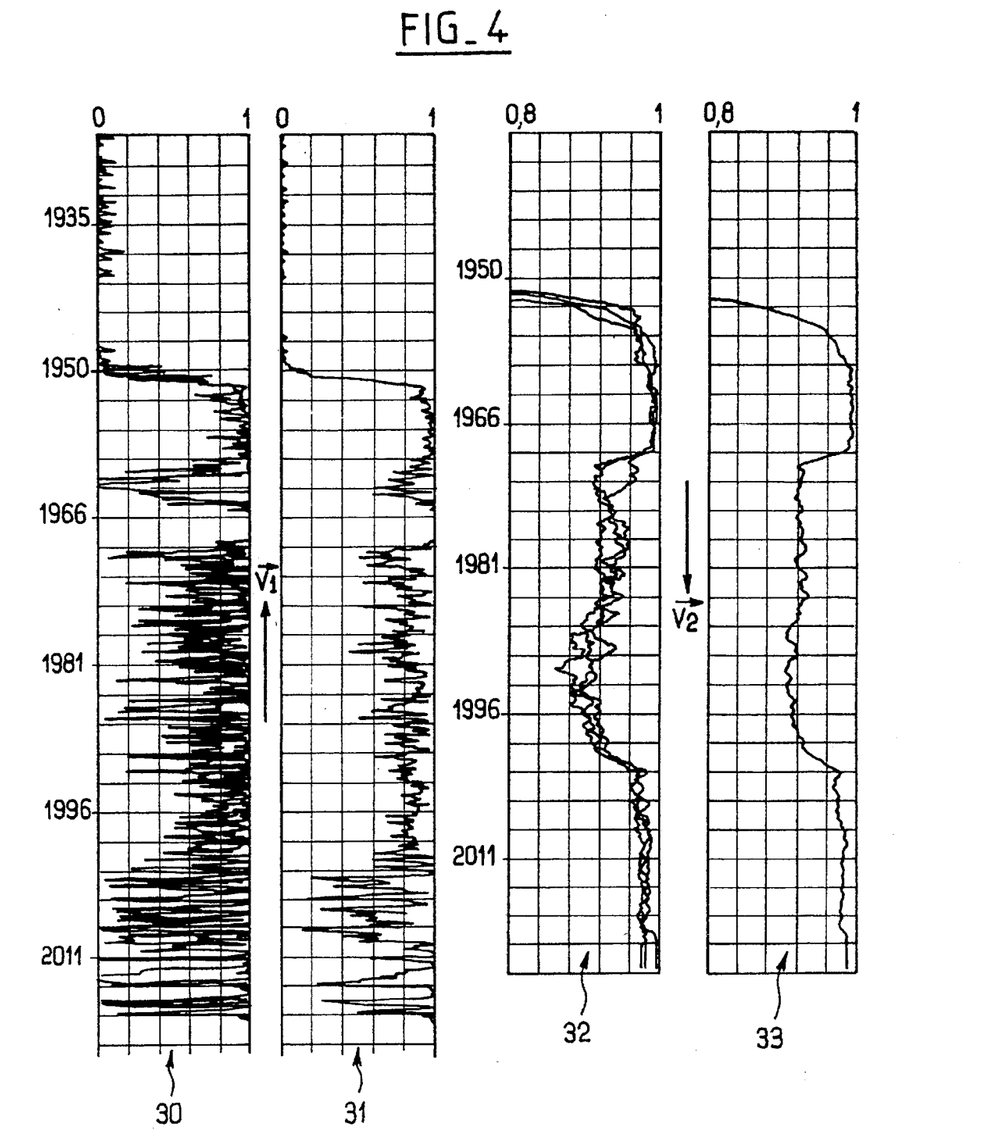
FIG. 4 comprises diagrams obtained at different displacement speeds of the probe and for electrode spikes constituted by materials of different kinds.
Figure 5:
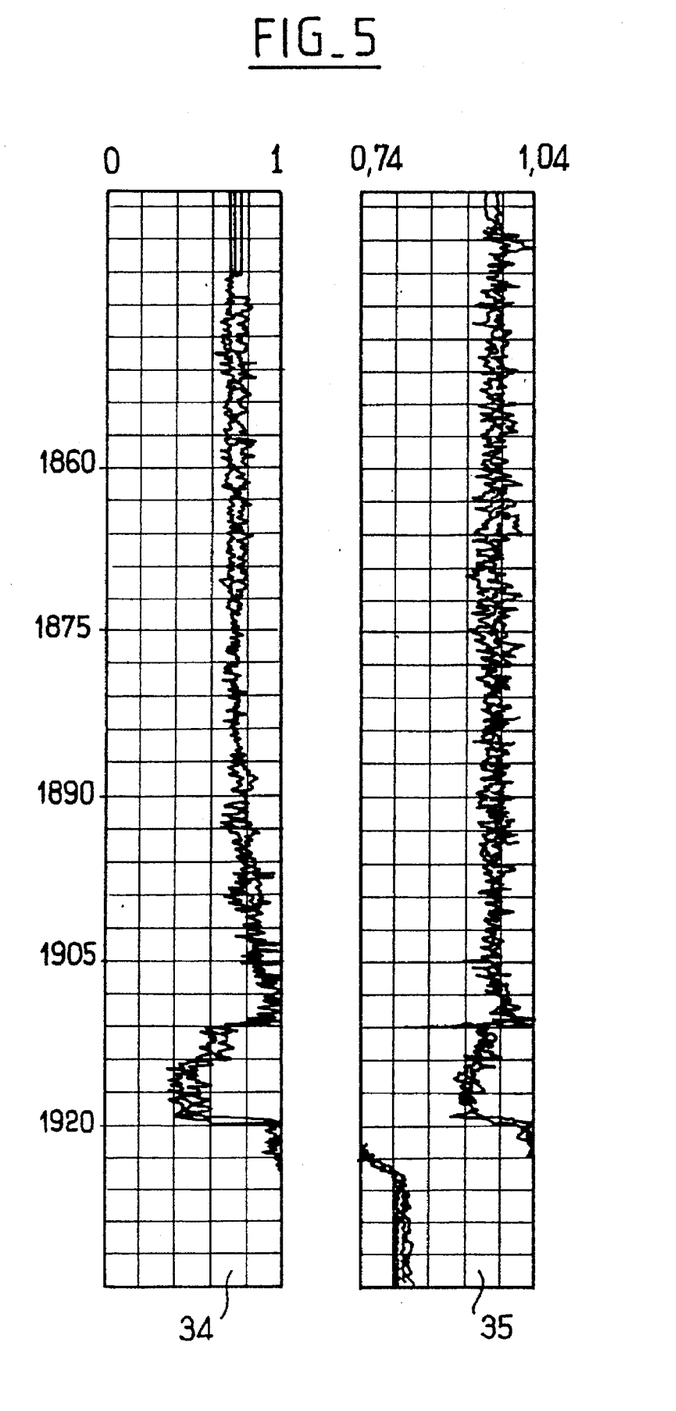
FIG. 5 comprises comparative diagrams of measurements obtained with the apparatus of the invention and with conventional apparatus of the gradiomanometer type.

FIGS. 4 and 5 show variations in oil hold-up vs. depth in the well, and as calculated on the basis of electrical signals such as those shown in FIG. 3. The righthand side is marked 1 and corresponds to pure hydrocarbon fluid; the lefthand edge corresponds to a purely aqueous fluid. The scale is indicated by specifying the low level reached. Since the fluid is a two-phase fluid, the water hold-up corresponds to the complement to 100%. Depth is given in meters.

FIG. 4 shows another important factor, namely the influence of the direction in which the tool is moving. Diagram 30 represents recordings obtained between 2011 m and 1935 m, on the basis of four sensors, with measurements being taken in a vertical well while the tool was moving upwards at a speed V1 of 10 feet per minute. All four sensors provide signals that superpose fairly well but that are relatively erratic. Diagram 31 corresponds to the mean curve obtained from the above four recordings and it is very difficult to interpret.

In contrast, while the tool is moving against the flow with a downward speed V2, likewise of 10 feet per minute, fluctuations are much smaller, as can be seen by comparing diagrams 32 which has three recordings obtained using a sonde having three sensors and diagram 33 which shows the corresponding mean value.

The difference between these results is probably due to the fact that in the first case bubbles have a certain tendency to remain in contact with an electrode, and so they accompany the motion thereof. This phenomenon is amplified herein since the upward speed of the tool was close to the speed of the fluid, and it could have been avoided by reducing the upwards speed. In any event, by performing measurements in a counterflow situation, the problem is eliminated.

It should be emphasized that recording 32 relates to signals taken from sensors formed by electrodes of different design with respect to the conductive material which was gold, tungsten, or molybdenum, depending on the electrode. The values calculated for the hold-ups are remarkably similar, particularly when it is observed that in recordings 32 and 33, one square corresponds to a difference of only four percentage points. The superposable nature of the three received signals shows that the nature of the material used is not a factor of major importance in this type of measurement, even if it is preferable to use a material that is simultaneously a very good conductor and highly resistant to corrosion and to abrasion.

It should also be observed that the downwards speed of the tool can be modulated to a very large extent. Diagram 34 in FIG. 5 corresponds to five successive recordings performed at the same depths, with the tool displacement speed being successively equal to 10, 30, 60, 90, and 120 feet per minute (tool moving downwards). All five curves practically coincide. Nevertheless, greatest accuracy is obtained when the downwards speed of the tool remains moderate, e.g. less than 50 feet per minute.

FIG. 5 also has diagram 35 which shows experimental curves obtained using a conventional tool of the gradiomanometer type at the same tool displacement speeds. The measurements are much more dispersed in this case, which indicates greater sensitivity of the gradiomanometer to differences in tool displacement speed. In general, it has been found that measurement accuracy is improved with a tool of the invention, particularly when its displacement speed is moderate. It should also be recalled that measurements performed with a gradiomanometer require accurate knowledge about the density of the fluids, whereas the tool of the invention requires no such prior calibration.

But above all, it is much easier to identify the levels of oil inflows using a tool of the invention. The peak between 1900 m and 1910 m is much more marked using the tool of the invention whereas it is difficult to distinguish using the gradiomanometer, even if the scale is greatly expanded. The diagram of the invention is also the only one to show very clearly the existence of two distinct levels of oil inflow, one a little before 1920 m and the other at about 1915 m. This makes it possible to perform much more accurate mapping of the well, and it is worth re-emphasizing that this can be done without any prior knowledge and without using special tools for interpreting measurements.

Figures 6, 6A:
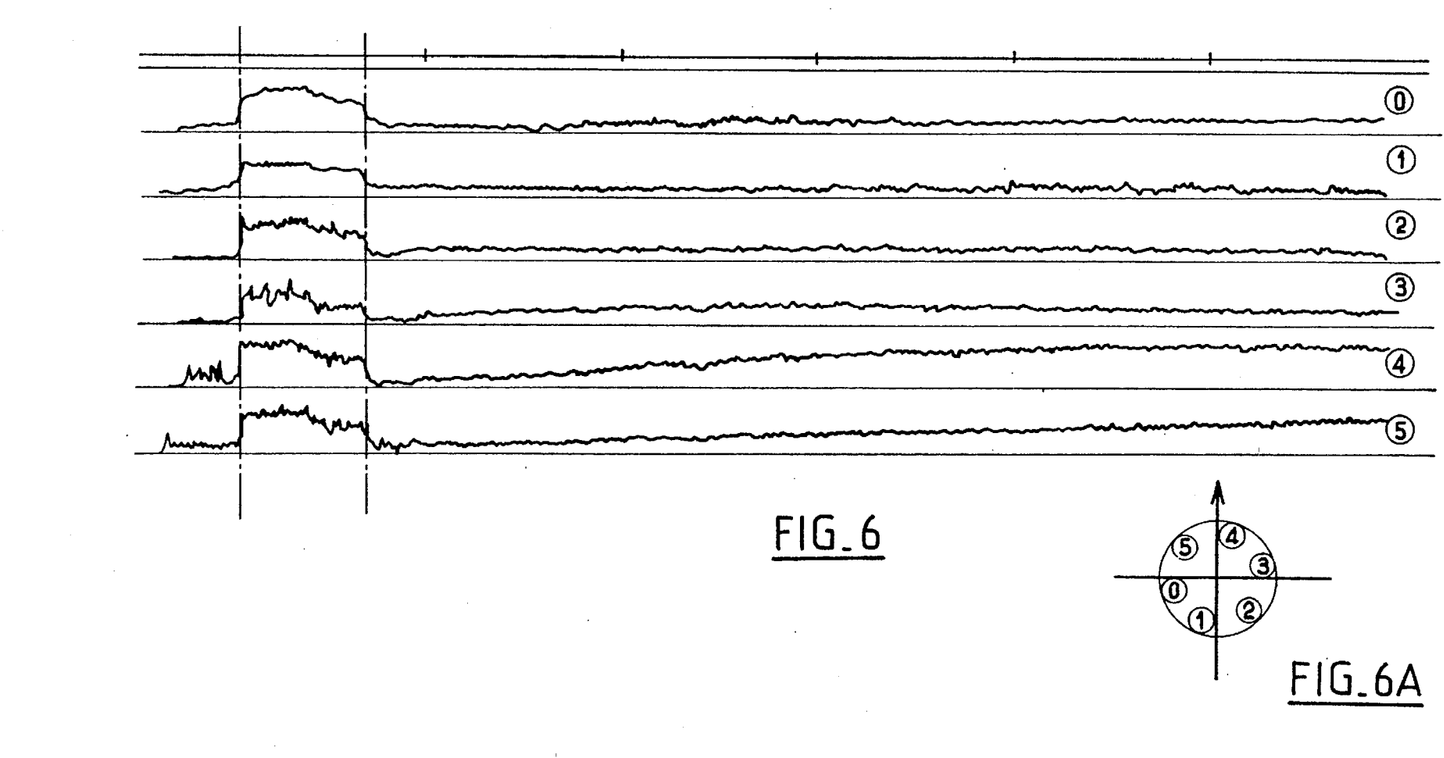
FIG. 6 gives diagrams obtained in a deviated well, with an indication of the disposition of the electrodes relative to vertical and horizontal planes (FIG. 6A)

A particularly advantageous aspect of the tool of the invention is that it makes it possible to analyze flow in deviated wells. FIG. 6 illustrates this aspect by giving curves that show variation as a function of depth in the hold-up as obtained using a tool of the invention that includes six sensors, with measurements being performed in a well that is deviated by 28° relative to the vertical. The disposition of the sensors compared with the two major axes of the well is given in FIG. 6B.

In zone 36 of oil inflow, the curves are very similar regardless of sensor position, even though oil inflow takes place asymmetrically, in contrast to what happens in a vertical well. The flow of oil penetrating into the well is large enough to cause flow to be turbulent. However, once the tool moves away from the production zone, a large disparity between the various hold-ups can be observed as a function of the positions of the sensors. The lowest sensor, sensor No. 1, is immersed in a phase that is essentially aqueous. Conversely, the highest sensor in the section of the well, sensor No. 4, is immersed in a phase that is dominated by hydrocarbon, where water constitutes the dispersed phase.

Intermediate situations apply to the other sensors, with electrodes Nos. 0 and 2 having very low oil contents and with the oil contents being greater for sensors 3 and 5.

This clearly indicates a phenomenon whereby the various phases become stratified, oil occupying the upper portion of the cross-section and water the lower portion, and with a mixed phase at the interface. It may be emphasized that such a phenomenon occurs, above all, in deviated wells of low productivity, precisely the kind of well in which it is essential to obtain accurate measurements of hold-up.

Knowledge of the volume proportions of each phase at various local points across the section of a well can be used to calculate a mean value for the hold-up of each phase, across the entire section of the well, either merely by integrating the local values across the entire fight section of the well (as is justified for wells that are vertical or nearly vertical), or else by using more elaborate models, such as the model proposed in French patent No. 2 637 089.

Figure 7:
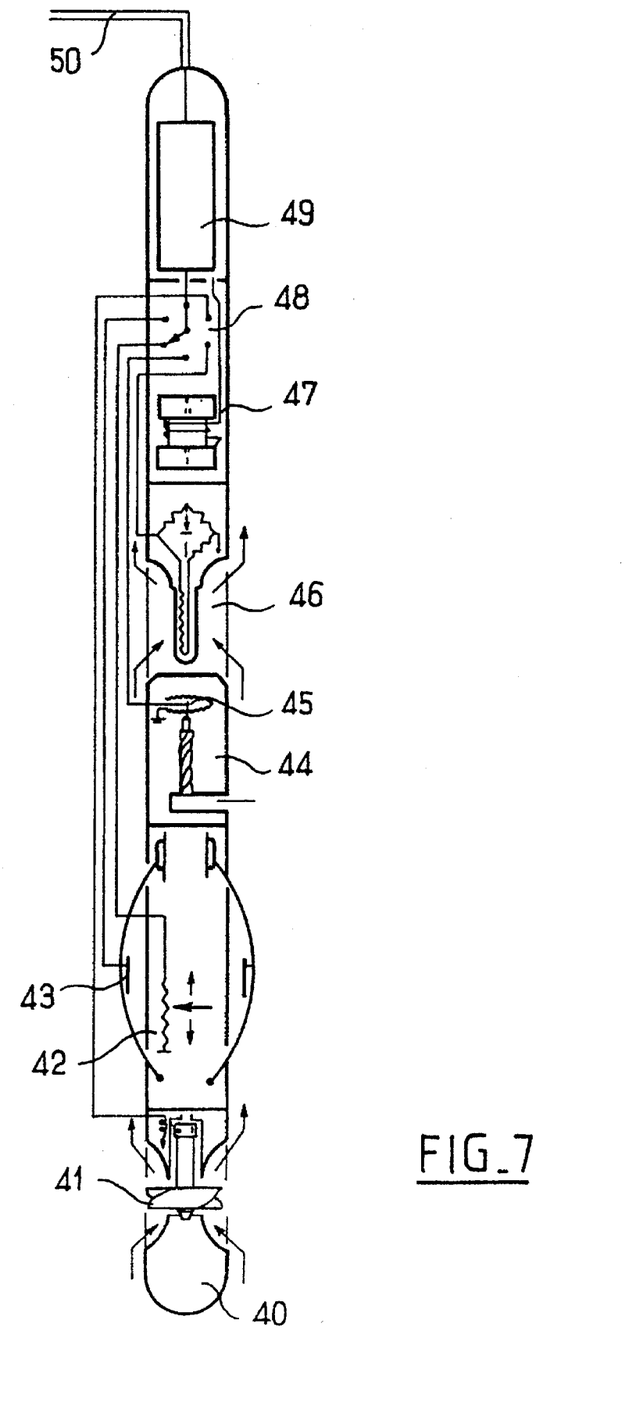
FIG. 7 shows an assembly comprising a plurality of tools.

The tool of the invention is particularly suited to performing production tests on a well, and the low voltages required make it advantageous to provide electrical power from batteries. The tool can also be used for performing studies on wells that are already in production. In general, the tool is associated with other tools that are commonly used for evaluating the performance of production wells, for example a "continuous" or "full hole" type spinner flowmeter, a pressure gauge, a thermometer, or a caliper. FIG. 7 is a diagram of an assembly comprising a plurality of tools, and it is constituted, from bottom to top, by a nose 40, a spinner flowmeter 41, a caliper 42 having arms that act as supports for the sensors 43 of the invention, a pressure gauge 44 including a strain gauge 45, a thermometer 46 having a resistance that is sensitive to temperature, a detector 47 for detecting joints in the casing, a relay 48 for selecting which tool to use, and an electronics cartridge 49. The assembly is suspended from a single cable 50.

Such an assembly constitutes a configuration that is particularly well adapted to performing standard measurements in a production well. Compared with conventional assemblies, its total length is reduced by omitting the gradiomanometer, the means of the invention for measuring hold-up being housed on the caliper, thus achieving a saving of about 1 meter of overall length.

Interpreting the recordings obtained during a single descent down the well, either sequentially or simultaneously, provides a flow profile of the various fluids and the production characteristics of the layers.

We claim:

1. A method of producing, in a hydrocarbon well, a signal indicative of a local flow parameter of a multiphase fluid, comprising the steps of:

placing at least one local sensor having a spike portion in the fluid, said spike being electrically conductive, and having a pointed tip having a radius of curvature less than approximately 100 microns and a base which is large relative to the pointed tip;

producing at the spike portion a signal having a level characteristic of the phase in which said sensor is placed; and determining a local flow parameter of the multiphase fluid as a result of the signal.

2. A method according to claim 1, wherein said signal is responsive to the impedance of the fluid in which the local sensor is placed.

3. A method according to claim 2, wherein said signal is representative of the resistivity of the fluid.

4. A method according to claim 1, wherein said signal has frequency in the range of 100 kHz to 300 kHz.

5. A method according to claim 3, applied to a multiphase fluid having an aqueous phase, wherein said phase is used as electrical ground.

6. A method according to claim 1, wherein a tool carrying the sensor is displaced at a speed that is slower than a speed of the fluid, said speeds being measured positivity in an upward direction relative to the hydrocarbon well.

7. A method according to claim 5, wherein the tool is displaced against the flow of the fluid during measurement.

8. The method according to claim 1, comprising the step of determining from said signal a value of local hole-up of each phase of the fluid.

9. The method of claim 8, comprising the steps of determining values of the local holdup at a plurality of points across a section of the well and determining from resulting plurality of values thus obtained a mean value for the section of the well.

10. The method according to claim 8, further comprising the step of measuring flow rate in the well.

11. The method according to claim 8, comprising the step of determining from said value presence of water and hydrocarbon inflow into the well.

12. The method according to claim 9, comprising the step of determining from said value presence of water and hydrocarbon inflow into the well.

13. The method according to claim 8, comprising the step of determining a stratified structure of phases a flow of a deviated well.

14. Apparatus for producing, in a hydrocarbon well, a signal indicative of a local flow parameter of a multiphase fluid, comprising at least one local sensor and means for generating a signal at a point in the fluid, a level of the signal being characteristic of a phase that surrounds said sensor, said sensor having an electrically conductive spike portion having a pointed tip with a radius of curvature of less than 100 microns and a base, which is large relative to the pointed tip.

15. Apparatus according to claim 14, wherein the radius of curvature is less than 50 microns.

16. Apparatus according to claim 14, wherein the diameter of said local sensor is less than 1 mm over the entire length of the spike.

17. Apparatus according to claim 15, wherein the diameter of said local sensor is less than 1 mm over the entire length of the spike.

18. Apparatus according to claim 14, wherein the length of the spike is less than 1 mm.

19. Apparatus according to claim 14, wherein said local sensor is responsive to resistivity of the phase.

20. Apparatus according to claim 19, wherein frequency of current to the sensor lies in the range 100 kHz to 300 kHz.

21. Apparatus according to claim 20, wherein a voltage applied to the sensor lies in a range 2V to 20V.

22. Apparatus according to claim 14, wherein the tool includes a plurality of local sensors.

23. Apparatus according to claim 14, wherein the sensor is made of tungsten.

24. Apparatus according to claim 14, wherein the surface of the spike contains gold.

25. Apparatus according to claim 14, wherein the impedance of the sensor is less than 1500 ohms.

26. A method of characterizing flow of a multiphase fluid from a hydrocarbon well, comprising:

producing a signal related to a local flow parameter of the fluid using at least one local sensor having an electrically conductive portion having a pointed tip with a radius of curvature of less than about 100 microns and a base which is large relative to the pointed tip, the signal having a level indicative of a phase of the fluid in which the tip is immersed;

using the signal to determine flow of various phases comprising the multiphase fluid; and characterizing flow of the multiphase according to determined flow of various phases.

27. Apparatus according to claim 14, wherein the spike is a cone having a cone angle less than 90°.

28. Apparatus according to claim 14, wherein the spike is wedge-shaped having an angle between faces less than 90°.

29. Apparatus according to claims 14, wherein the sensor has a low contact impedance less than 0.5 ohms per centimeters squared.

30. Apparatus according to claim 29, wherein the sensor has a low contact impedance less than 0.05 ohms per square centimeter.

31. Apparatus according to claim 14, wherein the sensor has a non-electrically conductive portion made of a material which is easily wetted by a film of oil.

32. A method of producing, in an oil well in which the flowing fluid may comprise a water phase and an oil phase, a signal indicative of the local holdup, comprising the steps of placing at least one local resistivity sensor in the fluid, and producing a signal whose level indicates whether said sensor is immersed in a water or an oil phase, said signal being generated at a spike whose radius of curvature is less than 100 microns.

33. An apparatus for producing a signal indicative of the local holdup in an oil well in which the flowing fluid may comprise a water phase and an oil phase, including at least one local resistivity sensor and means for generating a signal at a point in the fluid, the level of the signal indicating whether said sensor is immersed in a water or an oil phase, said local sensor having a spike whose radius of curvature is less than 100 microns.

* * * * *